United States Patent
Stayt, Jr.

(10) Patent No.: US 7,380,266 B1
(45) Date of Patent: May 27, 2008

(54) TRANSMISSION METHOD AND APPARATUS FOR OPTICAL FIBER TELEVISION NETWORK

(75) Inventor: John W. Stayt, Jr., Schnecksville, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/392,817

(22) Filed: Sep. 9, 1999

(51) Int. Cl.
*H04N 5/445* (2006.01)
*H04N 7/173* (2006.01)
*G06F 3/00* (2006.01)
*G06F 13/00* (2006.01)

(52) U.S. Cl. ............... 725/115; 725/38; 725/86; 725/116

(58) Field of Classification Search ............... 725/115, 725/86, 116, 38
See application file for complete search history.

(56) References Cited

U.S. PATENT DOCUMENTS

| | | | | |
|---|---|---|---|---|
| 5,583,560 A * | 12/1996 | Florin et al. | ........... | 725/40 |
| 5,734,589 A * | 3/1998 | Kostreski et al. | ........... | 345/716 |
| 6,157,929 A * | 12/2000 | Zamiska et al. | ........... | 707/200 |
| 6,327,418 B1 * | 12/2001 | Barton | ........... | 386/46 |
| 6,337,715 B1 * | 1/2002 | Inagaki et al. | ........... | 348/553 |
| 6,449,688 B1 * | 9/2002 | Peters et al. | ........... | 711/112 |
| 6,546,426 B1 * | 4/2003 | Post | ........... | 709/231 |
| 6,728,965 B1 * | 4/2004 | Mao | ........... | 725/38 |

* cited by examiner

*Primary Examiner*—Hunter B. Lonsberry

(57) ABSTRACT

A method and apparatus by which television service is provided to the home via a two-way fiber optic link. The television set transmits to the central office the channel or channels being watched. Information from all other available channels which are not being watched is constantly being buffered and up-dated at the television set location. The buffering can be performed using a bandwidth available on the optical fiber that is not being used for the one or two television channels being watched or for other uses. When a user changes channels, he is shown the buffered data for a limited time. When the buffer runs out, the home office is notified of the channel change and commences transmitting the newly selected channel in full.

38 Claims, 3 Drawing Sheets

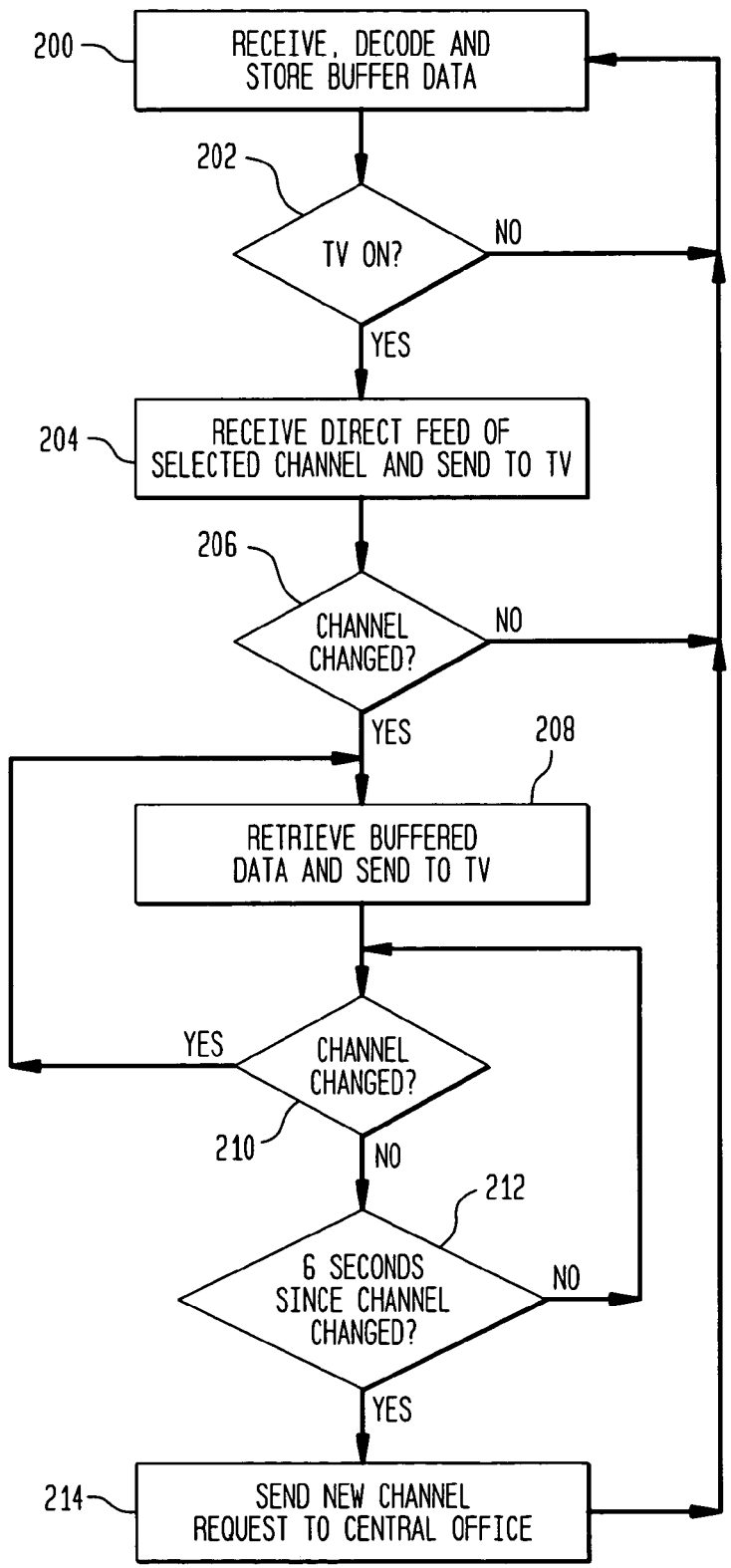

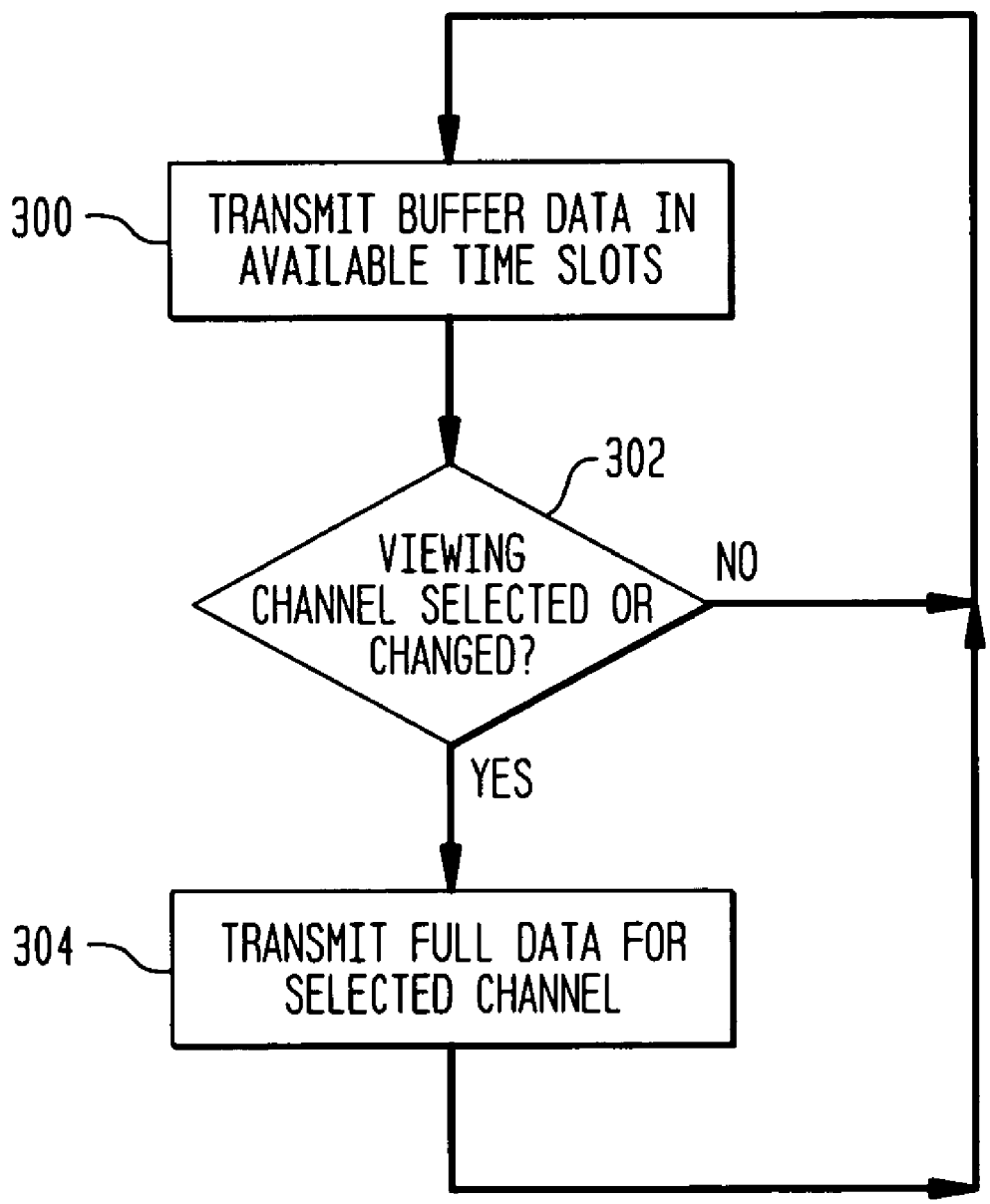

TRANSMISSION METHOD AND APPARATUS FOR OPTICAL FIBER TELEVISION NETWORK

FIELD OF INVENTION

The invention pertains to the provision of rapid access to multiple channels in a limited bandwidth environment in which all channels cannot be transmitted simultaneously. More particularly, the invention pertains to fiber optic television networks.

BACKGROUND OF THE INVENTION

Presently, most television viewers receive their television signals through one of three primary media. The oldest method is through radio frequency broadcast of analog signals from earth based transmitting antennae.

In the United States, for example, each television channel is provided 6 MHz of bandwidth in the radio frequency range. The radio frequency bandwidth provided for television in the United States offers 12 channels (channels 2-13) in the very high frequency (VHF) range and an additional approximately 71 channels in the ultra high frequency (UHF) range.

Radio frequency broadcast television is an analog system. That is, the television signals are broadcast in analog form. Since transmission antennas are earth based, and transmission powers are limited by law, adequate reception is commonly limited to less than 100 miles from the transmitting antenna.

Probably the most prevalent method today is via community antenna television (CATV), more commonly called "cable television". With cable television, television signals are received via satellite receiving antennae at a central location from signals that are transmitted from geo-stationary earth orbiting communications satellite antennae. The television signals are then transmitted from the central location over a communications network to the television sets in the homes of the various subscribers of the network.

In cable television systems, coaxial cables are run from the receiving antenna location either underground or on telephone poles to the homes of the various subscribers. Due to the analog nature of CATV signals and the attenuation of signal strength transmitted over a coaxial cable over large distances, CATV networks typically span less than a 50 mile radius. The bandwidth of cable television networks is limited by the physical characteristics of the coaxial cable. Shielded coaxial cable has an extremely wide bandwidth and can typically carry upwards of 150 channels of analog television signals (6 MHz/channel).

A more recent system which is gaining in popularity is through satellite reception directly at the home. A subscriber to such a system is provided with a small, low cost, satellite dish receiving antenna for receiving satellite transmission of digital television signals directly from a earth orbiting geo-stationary communications satellite. This type of system is commonly termed DSS (for Digital Satellite System) or DDS (for Direct Digital Satellite).

The bandwidth of DSS systems is great enough to provide over 100 channels of television.

The use of fiber optic cables to transmit television signals is now being investigated. Fiber optic television networks had been explored earlier, but most of that work, including bringing optical fiber directly into the home, had been abandoned. Particularly, fiber optic cables have extremely wide wavelength bandwidth. Attempts had been made to utilize the extremely wide bandwidth available on an optic fiber to transmit a reasonably necessary number of television stations (over 30) by wavelength division multiplexing. That is, by transmitting different channels with different wavelength light and selecting the appropriate wavelength light corresponding to the desired channel to be viewed. Such systems were generally not well received because the equipment needed to transmit/receive with many different wavelengths on a single fiber tended to be expensive and difficult to operate in a stable manner. In such prior art systems, the signal was transmitted as an analog signal.

However, with the expected increasing prevalence of digital data being transmitted to residences, fiber optic transmission means are again coming under increased scrutiny. For instance, it is envisioned that in the near future, telephone, Internet, E-mail, and television services to the home will all be digital.

While digital fiber optic communications has many significant advantages such as the ability to transmit information over extremely long distances efficiently and with little interference or loss of data, it also has some drawbacks. For instance, with current fiber optic communications technology, digital bandwidths of up to 40 Gbps (billion bits per second) are achievable. However, achieving such bandwidth is extremely expensive and, therefore, not practical for bringing television signals into individual homes. Particularly, the household node equipment for delivering television service to a home must cost on the order of a few hundred dollars in order to be practical. It is believed that a limit of about 500 Mbps to 1 Gbps of bandwidth can be practically delivered with present equipment costing no more than a few hundred dollars. A high quality digital television signal comprises about 30 to 40 Mbps, including video, audio, signaling and other components. If we assume a bandwidth of about 500 Mbps, then only about 12 to 15 channels of high quality digital television can be provided. If a single, low cost, optical fiber is to be used for telephone communications, Internet communications, and television, for instance, then the amount of that bandwidth that is available strictly for television is reduced.

Most television viewers watch just one channel or possibly two channels (with picture-in-picture technology) simultaneously. It is conceivable that viewer may also be receiving a third channel that is simultaneously being recorded by a VCR. Thus, even if three viewers in a single household each had a television tuned to view two different television programs all on different channels and each also had a VCR tuned to another different channel, there would be enough bandwidth available on a typical optical fiber to transmit the 9 different channels of television data.

In broadcast, cable and DSS television systems, all channels are transmitted simultaneously and are immediately available when a user changes a channel. With the huge selection of channels of TV programming and the instantaneous accessibility thereof, many television viewers have developed a habit of "channel surfing". As used herein, the term "channel surfing" refers to rapidly changing channels and viewing the content being broadcast on each channel for only an extremely limited period of time, typically 2-10 seconds. For instance, during a commercial break in a program being watched by a viewer, he or she may "channel surf" to determine what programs are being shown on all or some of the other television channels.

Television viewers have become accustomed to cable television and DSS television networks that provide approximately 60 to 120 channels of simultaneous television programming that can be surfed very quickly. With current technology, digital communication over a low cost optical fiber simply does not provide sufficient bandwidth to transmit 100 or even 50 simultaneous channels of television programming.

Accordingly, it is an object of the present invention to provide a fiber optic television network that can provide the services and features which viewers have come to expect from their television services.

SUMMARY OF THE INVENTION

The invention is a method and apparatus for simulating simultaneous reception of a substantial number of television channels within a bandwidth smaller than that actually required to simultaneously receive such a number of channels. In order to provide relatively instantaneous access to a large number of television channels, e.g., 100 channels, on an optical fiber that can support only a smaller number of television channels, e.g., 10 channels, the one or more channels being watched for an extended period of time are transmitted in full. The remaining available bandwidth is used to transmit television data for buffering at the receiving location. In particular, less than the full channel data for each of the channels not being viewed is transmitted in the remaining bandwidth. For instance, 6 second intervals of the programming on each of the other channels can be transmitted at 3 minute intervals and stored in a buffer for immediate access. If the user watches any of the buffered channels for less than 6 seconds, the user can determine roughly what is being transmitted on that channel at that time. If the user stays on that channel for longer than 6 seconds, then the television sends a signal to the central office indicating that the central office should now transmit that channel in full mode, rather than the one that it had previously been transmitting in full mode. The user typically would observe a "jump" in transmission at the point at which the buffer is truncated and the full channel transmission begins.

In one embodiment of the invention, the information that is placed in the buffers is the instantaneous data being transmitted on that channel at the time of the buffering. Accordingly, every time a user changes channels and views the buffered data, he is watching data from the recent past. However, in alternative embodiments of the invention, the data may be buffered in advance. In particular, the vast majority of television programming is prerecorded and can be transmitted for buffering ahead of time. In this type of system, the buffer should be made large enough to hold a plurality of samples for each channel. When a user changes to a given channel, the sample most closely corresponding in time to the present time is read out to the television. In this type of system, in which the buffer information for channels is transmitted ahead of time, the buffers can be filled more effectively since buffering can occur while no television program is being watched, thus, providing even greater transmission bandwidth for buffering. Further, the samples to be transmitted for storage can be selected so as to transmit program samples that are highly indicative of the program. For instance, samples can be selected so as to avoid samples of commercial breaks.

BRIEF DESCRIPTION OF THE DRAWINGS

FIG. 2 is flow chart illustrating operation of a converter box in accordance with the present invention.

FIG. 3 is a flow chart illustrating operation of the computer at the central office in accordance with the present invention.

DETAILED DESCRIPTION OF THE INVENTION

Figure 1:
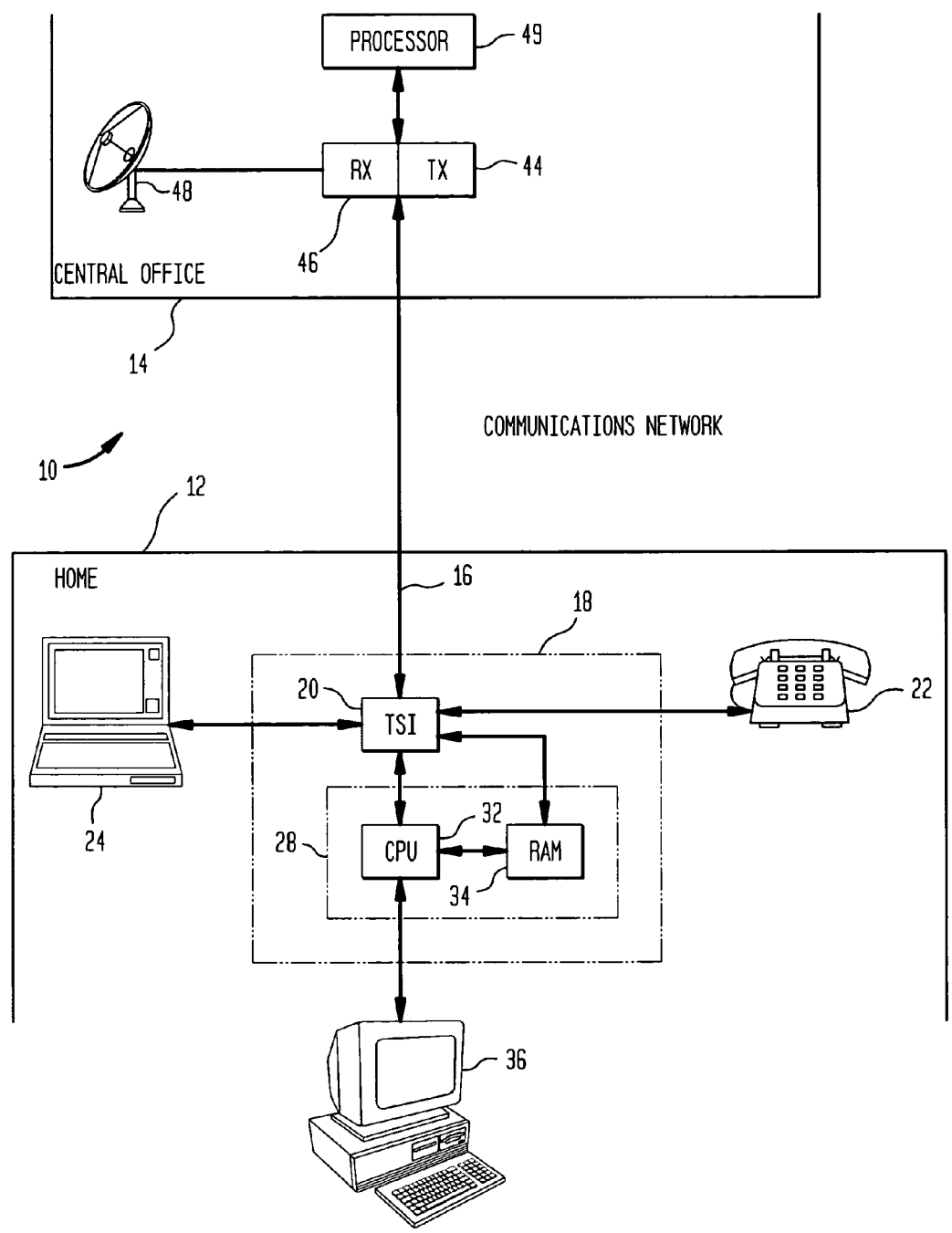
FIG. 1 is block diagram of an optical fiber television network in accordance with the present invention.

FIG. 1 is a block diagram of a fiber optic communications network for providing television, telephone, and Internet services to a household. Because the invention can be adequately illustrated and described in connection with the communication between a single household and a central service office, FIG. 1 illustrates only a single household node 12 in the network. However, it should be understood that a typical communications network comprises a central office 14 and a plurality of household nodes 12. Further, the present invention primarily relates to the provision of multiple channels of television service over an optical fiber having less available bandwidth than is needed to transmit the entire multiple channel television information. Accordingly, for ease of illustration and explanation, the connection between the central office and the home is shown in the illustration as a single optical fiber. However, it will be understood by those skilled in the art that the fiber optic communications network typically comprises many fibers and additional equipment, including, fiber optic repeaters, switches, splitters and routers. However, the final link from the curb to the household desirably comprises a single fiber 16 through which all of the above mentioned services are provided.

While it is feasible to provide two or more fibers into the household, the cost of the equipment needed within the household to select between multiple fibers would add cost to the service provider. Accordingly, it is desirable to have only one fiber per household from the curb to the home. The services are then distributed in the home to the various pieces of equipment, e.g., televisions, telephones and computers, through a fiber optic local area network within the home.

The digital bandwidth necessary to provide fast Internet service is approximately 1-2 Mbps (megabits per second). The digital bandwidth needed to provide two lines of telephone service is about 128 Kbps (kilobits per second). The digital bandwidth required to transmit one channel of broadcast quality television is approximately 40 Mbps. Accordingly, the digital bandwidth necessary to provide, for example, 100 channels of broadcast quality television is 4 Gbps. With present technology, digital bandwidths up to approximately 500 Mbps to 1 Gbps (Gigabit Ethernet) appear achievable over a single optical fiber in the relevant price range. This limitation is not necessarily a limitation of the optical fibers themselves, but of the signal generating and receiving equipment in the relevant price range. Nevertheless, it is presently impractical to simultaneously transmit 60 to 120 or more channels of television information into a household over a single fiber optic cable.

As previously noted, there is only enough bandwidth available on a single fiber to support a few television channels. This does not present a problem with respect to continuous viewing of a television program. Particularly, even in a house with three televisions, each with picture-in-picture technology (two tuners), members of the household could not be viewing more than nine different television programs simultaneously.

Communications on the fiber would be bidirectional for purposes of telephone or Internet communications. However, the bidirectionality provided by the system would also be used for television viewing. Specifically, whenever a channel is selected for viewing, a signal is sent to the central office indicative of the selected channel. The central office can then send the selected channel to the household. Accordingly, the transmitting office can selectively transmit to the household only the 9 channels being actively used in the particular household.

However, a problem arises when a viewer wishes to channel surf. In order to channel surf, all 100 channels must be instantaneously or almost instantaneously available. The delay required to generate and send channel select commands to the central office and for the central office equipment to respond and commence sending back the newly selected channel data, is non-negligible. In particular, a viewer who is channel surfing typically spends less than three seconds on most channels. In fact, the time spent on each channel commonly may be substantially less since many viewers can essentially instantaneously determine whether or not he or she has any interest in the program on a particular channel. The above-noted delay associated with switching channels in a bidirectional fiber optic digital communications network may actually be longer than the time the viewer would spend viewing a channel during channel surfing. Therefore, such delay would be a significant annoyance to a viewer who has become accustomed to instantaneous access to all 100 channels.

The present invention proposes a solution to this problem comprising buffering small samples of the data on all of the television channels in a local memory within the household. The buffering can simply be of the data that happens to be the real-time transmission for that channel during the period when buffering for that channel occurs. However, since the vast majority of television programming is pre-recorded and since it typically is known well in advance what will be transmitted on a given channel at a given time, the buffering also can be done in advance. In fact, with a large enough memory, data samples can be buffered days in advance. Nevertheless, in a preferred embodiment of the invention, data is buffered only a few minutes in advance and is continuously overwritten with new buffering data as the time corresponding to the pre-existing buffered data passes.

For example, let us assume that an optical fiber from the curb into the household can support two telephone channels, two Internet channels and twelve full television channels. Thus, even when both telephones are in use, both Internet channels are in use and two television channels are in use, that leaves time slots that can support approximately ten channels available for buffering television programming.

With time slots sufficient to carry ten television channels available for buffering, six second samples taken at one minute intervals can be buffered for up to 100 television channels. Alternately, 100 channels of programming can be buffered with a resolution of $\frac{1}{10}$ standard resolution almost instantaneously.

It is envisioned that many fiber optic-television networks will employ time division multiplexing (TDM) in order to provide multiple communication channels to the home (including multiple television channels, multiple telephone channels and multiple Internet access channels). In a TDM communications network, data is broken down into frames with each frame containing a plurality of time slots. Each active communication channel is assigned one or more time slots per frame within which the data on that channel is contained. For exemplary purposes, the present invention will be discussed herein below in the context of a TDM network. However, it should be understood that this is merely an exemplary type of network and that the present invention is applicable to many types of networks.

FIG. 1 is a block diagram of the relevant portion of a digital fiber optic communications network 10 in accordance with the present invention. The central office includes a transmitter 44 and receiver 46 for bidirectional communication via the network. The receiver 46 also receives television signals for a plurality of channels via an antennae array 48.

The central office further comprises a processor 49 for manipulating the data received via the antennae array and controlling communications over the network. A bidirectional optical fiber cable 16 is coupled between the central office and a household. In the household, the cable 16 is coupled to a distributor box 18 which might, for instance, be placed on top of a television set, much like the converter box of standard cable television systems. The distributor box includes circuitry for frame synchronizing to the incoming data, parsing the time slots and distributing them to the correct location. This circuitry is generally shown as a time slot interchange (TSI) circuit 20 in FIG. 1. The time slot interchange circuitry would operate on whatever protocol is being used for the communications network. Many TSI protocols are well known and the operation of the time slot interchange circuit 20 does not form part of the present invention, which is applicable to any type of network protocol. Time slots that are designated for telephony are sent to the telephone 22. Time slots that are designated for Internet communications are sent to a computer 24 and those time slots that are dedicated to television reception are sent to a television processing circuit 28.

The television processing circuit 28 includes a central processing unit 32 and a random access memory (RAM) 34. The RAM 34 will be used for buffering television channel data in accordance with the present invention.

On average, one second of high quality digital television data (including CD quality sound and video) in MPEG-2 format for instance comprises approximately 10.4 megabytes of memory. Accordingly, in order to provide enough memory to buffer a reasonable amount of information for 100 channels of television data, RAM 34 should comprise at least one gigabyte of memory and, preferably approximately 9-15 gigabytes of memory. CPU 32 is bi-directionally coupled to RAM 34. A CD-RW (Compact Disc-Read/Write) could be used as the storage medium. CPU 32 also is bi-directionally coupled to TSI circuit 20 in order to receive television data through TSI 20 from the central office 14 and in order to transmit television channel selection information from the television 36 to the central office 14. CPU 34 also is bi-directionally coupled to the television set 36 in order to transmit to the television set television data for the selected channel that is being received from the central office 14 and to receive from the television set 36 the aforementioned channel selection information.

In normal operation, TSI circuit 28 sends time slots for the channel(s) selected for viewing on the television set to CPU 34. CPU 34 forwards that information to the television set 36 for viewing. In at least some, and preferably all, time slots which are not being used for television viewing, telephony or Internet access, the central office transmits television channel buffering data. The CPU stores that information in RAM 34. RAM 34 is indexed such that all buffering information pertaining to a particular television channel is buffered in a particular set of locations. Accordingly, when the CPU first receives a signal from the television on line 37 indicating that the channel has been changed, it accesses the portion of the RAM dedicated to the channel which has been newly selected and transmits that buffered information to the television set for viewing. If the buffering system includes the feature of buffering multiple samples in advance, the samples could be time-stamped and an algorithm would be included in the software for selecting the sample most closely corresponding in time to the present. If, after a predetermined amount of time, e.g., five seconds, the channel has not been changed, the CPU automatically sends out a signal through TSI 28 to the central office and requests transmission of the newly selected channel in the time slots dedicated to viewing television.

In a preferred embodiment of the invention, the request to change channels is sent to the central office prior to reaching the end of the buffered data. In this manner, the information stream for the newly selected television channel commences prior to the end of the buffered data so that there is no gap of dead air between the end of the buffered data and the direct feed.

In most instances, the switch from the buffered data to the direct feed will result in a visible, unnatural, jump in the scene being viewed since the end of the buffered data most likely will not match up with the real-time direct feed most of the time. While the unnatural jump will be noticeable, it should not be too annoying to the viewer since the jump will occur within a few seconds after the viewer has commenced viewing that channel. Therefore, it would be highly unlikely that the viewer would consider anything in the portion of the television program which was "jumped" significant to his or her viewing pleasure.

With respect to those few television programs which are live, they also can be buffered. However, the buffering would be of past information rather than future information. In fact, most live television programs are broadcast on a seven second delay. Thus, for these types of programs, the buffering, in fact, can be future buffering, if desired, but only a few seconds in advance.

The buffering can be selective and/or prioritized. For instance, the CPU can keep track of the most watched channels in the household and provide more frequent, lengthy and/or up-to-date buffering on the television channels which the household watches most frequently and less or no buffering for those channels which the household watches less frequently or never.

Another possible variation is to provide a thumbnail feature. In such a feature, a viewer may press a button on a remote control to select a "thumbnail" feature. In response, the CPU can break up the television viewing screen into a plurality of low resolution motion thumbnail sketches of a plurality of different channels. In this manner, the user can quickly scan a plurality of channels simultaneously. Pressing the same button again can call up thumbnail sketches of a next plurality of channels. The channels may be organized in numerical order or in priority order as discussed above.

Another option to increase the ability to buffer, is to buffer lower than standard resolution samples. Accordingly, buffering can be more frequent or more lengthy using the same available bandwidth.

In a preferred embodiment of the invention, buffering can be performed well in advance, while the television is off, accordingly providing even greater bandwidth for buffering (i.e., the time slots that would be used for viewing can be used for buffering while the television is off).

FIG. 2 is a flow chart illustrating operation of the CPU 32 in accordance with one preferred embodiment of the present invention. In step 200, the CPU receives, decodes and stores buffered data as it comes in over the optical fiber. In step 202, it determines if the television is on. If not, it simply continues to retrieve, decode and store buffered data.

If the television is on, then it also receives a direct feed of the channel selected by the television and sends it to the television (step 204). Then, in step 206, the CPU determines whether the channel has been changed. If not, processing returns to step 200 and the retrieval, decoding and storage of buffering data as well as the receiving of a direct feed for the selected channel continues. If the channel is changed in step 206, however, processing proceeds to step 208 where the buffered data for the newly selected channel is retrieved and sent to the television for viewing. In step 210, the CPU again determines whether the channel has been changed. If it has, then processing returns to step 208 to retrieve buffered data pertaining to the newly selected channel. If not, processing flows to step 212 where it is determined if 6 seconds have lapsed since the last channel change. If not, the CPU continues to inquire whether the channel has been changed. When 6 seconds has passed since the last channel change, processing flows to step 214 where the CPU sends the new selected channel to the central office. Processing then returns to step 200 and buffered data continues to be stored (step 200) and the receipt of direct feed information (step 204) commences for the newly selected channel.

It should be understood that the retrieval, decoding and storage of buffered data and the receipt of the data for the channel selected for viewing on the television are continuing processes. For instance, during the loop of steps 212 and 214, although not shown as a separate step in the flow chart, the CPU, of course, continues to receive, decode and store buffered data.

Each individual memory section in RAM 34 dedicated to a channel is written circularly. In one embodiment, as data becomes stale, i.e., the current time passes the time-stamp of the data, that data is marked stale and can be overwritten by newly incoming data.

If the buffer space dedicated to that channel becomes full, buffering for that channel is ceased until more memory space becomes available. Alternately, in an embodiment in which only one sample per channel is stored at any given time, no time stamps would be necessary and the buffer memory space could simply be rewritten every time a sample is received for the channel corresponding to that memory space.

FIG. 3 is a flow chart illustrating operation at the central office. In step 300, the central office transmits buffering data to the home in the time slots which are not used for other purposes. In step 302, it checks to see if a channel has been selected or changed. If not, it simply continues to transmit buffering data. If a channel has been selected or changed, it commences transmitting the full data for the selected channel in a particular set of time slots (step 304) and then returns to step 300.

While the invention has been described in connection with a television service network and an integrated television/telephone/internet service network, it is equally applicable to essentially any type of data. For instance, there is no reason why audio data could not also be transmitted over the network.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

I claim:

1. A method of simulating simultaneous receipt of a plurality of data streams over a network using a bandwidth less than that needed to simultaneously receive said plurality of data streams, said method comprising the steps of:
   receiving one of said data streams selected by a user over said network;
   transmitting said one of said data streams to said user;
   receiving samples of the others of said data streams
   storing said samples in a memory non-contiguously in time with said data streams;
   responsive to said user newly selecting one of said other data streams, reading from said memory said sample that corresponds to said newly selected data stream; and
   transmitting said sample that corresponds to said newly selected data stream to said user.

2. A method as set forth in claim 1 further comprising the step of:
   at or before an end of said sample is read from said memory, commencing receipt of said newly selected data stream.

3. A method as set forth in claim 2 further comprising the step of:
   at or before the end of said sample is completely read from said memory, transmitting to a source of said newly selected data stream a request to receive said newly selected data stream.

4. A method as set forth in claim 3 wherein said step of receiving said samples comprises receiving said samples bearing time stamps indicating the time to which they correspond if received in said corresponding data stream.

5. A method as set forth in claim 4 wherein said storing step further comprises storing said time stamps associated with said samples and storing information indicative of the data stream to which said sample corresponds.

6. A method as set forth in claim 5 wherein said step of reading further comprises:
   selecting for reading from said stored samples a sample corresponding to said selected data stream having a time stamp most closely corresponding to a current time.

7. A method of simulating simultaneous receipt at a television of a plurality of television channels over a network using a bandwidth less than that needed to simultaneously receive said plurality of channels, said method comprising the steps of:
   (1) receiving the full data for at least a selected one of said television channels;
   (2) transmitting said full data for said selected television channel to said television;
   (3) receiving samples of data from each other of said television channels;
   (4) storing said samples in a memory non-contiguously in time with said data streams
   (5) responsive to selection of a new one of said television channels for viewing at said television, reading said sample of data corresponding to said newly selected television channel from said memory; and
   (6) transmitting said sample of data corresponding to said newly selected television channel to said television.

8. A method as set forth in claim 7 further comprising the steps of:
   (7) at or before said sample is completely read out of said memory, transmitting to a source of said newly selected channel a request to receive said full data on said selected channel; and
   (8) at or before said sample is completely read from said memory, commencing receipt of full data on said newly selected channel.

9. A method as set forth in claim 8 further comprising:
   (9) ceasing receipt of said full data of said previously selected channel.

10. A method as set forth in claim 6 further comprising the steps of:
    (8) responsive to said newly selected channel remaining selected for a predetermined amount of time, transmitting to a source of said newly selected channel a request to receive full data of said selected channel; and
    (9) commencing receipt of full data of said newly selected channel.

11. A method as set forth in claim 10 wherein said predetermined amount of time is less than a duration of said sample.

12. A method as set forth in claim 11 wherein said predetermined amount of time is an amount of time sufficiently smaller than the duration of said sample for steps (6) and (7) to be performed before said sample is completely read.

13. A method as set forth in claim 8 wherein said data on each of said channels comprises data that would be received at a particular time if receiving full data for said channel and wherein said step of receiving said samples comprises receiving samples bearing time stamps indicating the time to which they correspond if receiving full data for the corresponding channel.

14. A method as set forth in claim 13 wherein said storing step comprises storing multiple samples per channel, including said time stamps associated with said samples, and storing information indicative of the channel to which said sample corresponds.

15. A method as set forth in claim 14 wherein said reading step further comprises:
    selecting for reading a sample corresponding to said selected channel having a time stamp most closely corresponding to a current time.

16. A method as set forth in claim 15 wherein at least some of said samples correspond to times in said corresponding full data streams that are after the present time that they are stored.

17. A method as set forth in claim 16 further comprising the step of:
    marking samples as stale when said time stamp of said sample is earlier than the present time and wherein a sample may be overwritten when it has been marked stale.

18. A method as set forth in claim 8 wherein said samples comprise data that would have been transmitted in full mode for the corresponding channel at the time the sample was stored.

19. A method as set forth in claim 18 wherein a stored sample corresponding to each channel is overwritten each time a new sample corresponding to said channel is received.

20. A method as set forth in claim 7 wherein said samples are of a lower resolution than the full channel data.

21. A method as set forth in claim 7 further comprising the steps of:

responsive to a request from said television, reading a plurality of samples, each sample corresponding to a different one of said channels;

displaying said samples simultaneously on different portions of said television.

22. A method as set forth in claim 7 further comprising the step of:

prioritizing said plurality of channels.

23. A method as set forth in claim 22:

wherein said prioritizing step comprises determining the amount of time users watch each of said plurality of channels; and wherein said transmitting and storing steps comprise transmitting and storing more sample data for those channels that are watched more often.

24. A method as set forth in claim 23 wherein samples are transmitted and stored more frequently for those channels that are watched more often.

25. A method as set forth in claim 23 wherein samples corresponding to channels that are watched more often are longer than samples corresponding to channels that are watched less often.

26. A method as set forth in claim 23 wherein said determining step comprises determining the amount of time that each channel is transmitted in full to said television.

27. A communications network for simulating simultaneous transmission from a source to a node of a plurality of channels of data using a bandwidth less than that needed to simultaneously transmit said plurality of channels comprising:

a source for transmitting data over said network, said data comprising a plurality of channels of data;

at least one node for receiving data from said source;

a processor associated with said source, said processor programmed to transmit at least a first channel of data in full to said at least one node and to transmit samples of data from others of said plurality of channels to said node;

a memory associated with said node for storing said samples non-contiguously with said data streams to which they correspond;

a processor associated with said node, said processor programmed to send data on said first channel to a display device and to send said samples to said memory for storage and, responsive to a user selecting a second channel for viewing on said display device, reading said sample of data corresponding to said second channel from said memory.

28. A communications network as set forth in claim 27 wherein said processor associated with said node is further programmed to transmit to said source a request for full data transmission for said second channel responsive to said second channel remaining selected for a predetermined period of time and before the end of said sample is read out from said memory; and wherein said processor associated with said source is further programmed to transmit said second channel of data in full to said at least node responsive to said request.

29. A communications network as set forth in claim 28 wherein said data comprises television program data.

30. A communications network as set forth in claim 29 wherein said processor associated with said node is further programmed to transmit to said source a request for said full data for said channel requested for display, said request being issued a predetermined period of time before the end of said sample is read out of said memory and wherein said processor associated with said source is further programmed to switch the channel that is being transmitted in full to said node responsive to said request.

31. A communications network as set forth in claim 30 wherein said samples further comprise time stamps indicating the time to which they correspond in said corresponding channel and information disclosing the channel to which said data corresponds.

32. A communications network as set forth in claim 31 wherein said memory stores multiple samples per channel simultaneously and, when a user first requests a channel for display, said processor associated with said node is further programmed to read out from said memory said stored sample corresponding to said requested channel having a time stamp most closely corresponding to a current time.

33. A communications network as set forth in claim 32 wherein said stored samples comprise samples corresponding to times that are after the time that they are stored.

34. A communications network as set forth in claim 33 wherein said processor associated with said node is further programmed to mark stored samples as stale when said time stamp of said sample is earlier than the present time and wherein a sample may be overwritten when it has been marked stale.

35. A communications network as set forth in claim 29 wherein said samples comprise the data that would be transmitted in full mode for the corresponding channel at the time the sample is transmitted.

36. A communications network as set forth in claim 35 wherein said processor associated with said node is further programmed to overwrite a stored sample corresponding to each channel each time a new sample corresponding to said channel is transmitted.

37. A communications network as set forth in claim 27 wherein said samples are of a lower resolution than full channel data.

38. A communications network as set forth in claim 27 wherein, responsive to a request, said processor associated with said node is further programmed to read out a plurality of samples, each sample corresponding to a different one of said channels, for simultaneous display on said display device.

* * * * *